United States Patent
Patwardhan et al.

(10) Patent No.: US 8,935,575 B2
(45) Date of Patent: Jan. 13, 2015

(54) TEST DATA GENERATION

(75) Inventors: Nikhil Girish Patwardhan, Pune (IN); Ashim Roy, Pune (IN); Moksha Suryakant Jivane, Pune (IN); Varsha Jagtap, Pune (IN); Eeti Sancheti, Pune (IN); Nandita Babu, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 343 days.

(21) Appl. No.: 13/428,801

(22) Filed: Mar. 23, 2012

(65) Prior Publication Data

US 2013/0139003 A1 May 30, 2013

(30) Foreign Application Priority Data

Nov. 28, 2011 (IN) .......................... 3348/MUM/2011

(51) Int. Cl.
*G06F 11/36* (2006.01)

(52) U.S. Cl.
USPC ............. 714/38.1; 714/32; 717/124; 717/127

(58) Field of Classification Search
CPC .......................... G06F 11/3668; G06F 11/3676
USPC ........................................................ 714/38.1
See application file for complete search history.

(56) References Cited

U.S. PATENT DOCUMENTS

| | | | | |
|---|---|---|---|---|
| 2004/0216023 A1* | 10/2004 | Maoz et al. | .................... | 714/742 |
| 2005/0229062 A1* | 10/2005 | Volkerink et al. | ............. | 714/738 |
| 2006/0075305 A1* | 4/2006 | Robinson et al. | ............... | 714/38 |
| 2008/0216076 A1* | 9/2008 | Udell et al. | .................... | 718/100 |
| 2008/0243960 A1* | 10/2008 | Bergauer et al. | .............. | 707/205 |
| 2008/0320352 A1* | 12/2008 | Udell et al. | .................... | 714/739 |
| 2009/0164941 A1* | 6/2009 | Johnson et al. | ............... | 715/810 |
| 2009/0222696 A1* | 9/2009 | Duale | ............................. | 714/32 |
| 2009/0319832 A1 | 12/2009 | Zhang et al. | | |
| 2011/0296147 A1* | 12/2011 | Ichikawa et al. | .............. | 712/222 |
| 2012/0143813 A1* | 6/2012 | B'Far et al. | ..................... | 706/52 |

OTHER PUBLICATIONS

Test Data Compression Using Efficient Bitmask and Dictionary Selection Methods, Sep. 9, 2010, Kanad Basu, and Prabhat Mishra.
A Hybrid Method for Compressing Test Data, Aug. 20, 1998, Masahiro Ishida, Dong Sam Ha, and Takahiro Yamaguchi.

* cited by examiner

*Primary Examiner* — Chae Ko
(74) *Attorney, Agent, or Firm* — Barnes & Thornburg LLP (57) ABSTRACT

Systems and methods for test data generation are described. In one implementation, the method includes receiving seed data having one or more characteristics. Further, the method includes obtaining a selection criterion indicating a selected portion of the seed data to be transformed. Based on the selection criterion, the seed data is transformed for at least a plurality of iterations to generate test data. The test data comprise a plurality of data sets including a primary data set generated in a first iteration and a secondary data set generated in each subsequent iteration. The primary data set includes transformed data corresponding to the selected portion of the seed data and non-transformed data corresponding to a remaining portion of the seed data and each secondary data set includes transformed data corresponding to the selected portion of the seed data.

13 Claims, 6 Drawing Sheets

TEST DATA GENERATION

TECHNICAL FIELD

The present subject matter, in general, relates to software testing and, in particular, relates to generation of test data for testing software applications.

BACKGROUND

In general, software applications during their development stages are tested or assessed before they can be deployed. The testing validates that the applications are working in an expected or planned manner. For data-driven assessment of such applications, test data is required. For the data driven assessment to be effective, the test data should have certain desired characteristics, such as syntax, semantics, and statistics, similar to that of actual data, such as production data, which the application would eventually handle or operate on after deployment.

Possible candidates for test data may include production data. As indicated, the production data is the actual data on which the application would operate, and hence may be considered as suitable for the purpose of testing. However, production data may include sensitive information or information privy to individuals associated with it. For example, in case of banking applications, it would not be appropriate to use production data, i.e., client-specific information for testing purposes. In such cases, the production data can be modified by using data masking or data obfuscation techniques which either hide or delete user-specific information, and subsequently replace it with relevant but false data. Other approaches include using synthetic data or dummy data, as a test data for testing the applications. The synthetic data can be generated using various synthetic data generation tools. Using synthetic data for testing eliminates the risk of privacy breach as the data generated is fictitious.

SUMMARY

This summary is provided to introduce concepts related to systems and methods for generation of test data for testing software applications and the concepts are further described below in the detailed description. This summary is not intended to identify essential features of the claimed subject matter nor is it intended for use in determining or limiting the scope of the claimed subject matter.

In one implementation, the method includes receiving seed data having one or more characteristics. Further, the method includes obtaining a selection criterion indicating a selected portion of the seed data to be transformed. Based on the selection criterion, the seed data is transformed for at least a plurality of iterations to generate test data. The test data comprise a plurality of data sets including a primary data set generated in a first iteration and a secondary data set generated in each subsequent iteration. The primary data set includes transformed data corresponding to the selected portion of the seed data and non-transformed data corresponding to a remaining portion of the seed data and each secondary data set includes transformed data corresponding to the selected portion of the seed data.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to systems and methods for test data generation. As indicated previously, testing of software applications before they are deployed requires data known as test data. The test data should ideally include desired characteristics, such as syntax and semantics, similar to that of actual data or production data. It should be noted that the effectiveness of the test data depends on the type of characteristics. For example, in case of banking applications, bank account numbers would be based on a defined syntax, say a fixed length. The syntax can be based on the requirements of the organization. Test data should therefore possess the relevant characteristics to effectively implement the testing of the application in question. This further ensures that the proper response of the application to be tested is captured during the testing, and appropriate corrective actions, if required, can be implemented.

Typically, in order to validate the response of the application being tested, large volumes of test data are required. The production data, which is eventually utilized by the application and possesses right syntax and inborn semantics that capture business rules, is considered as most suited for testing the application to be deployed. However, concerns relating to privacy and sensitivity of the production data may deter one from using production data for performing testing of the application. Thus, synthetic data is used for testing the applications. The synthetic data can be generated using various synthetic data generation tools. The synthetic data generation tools demand near perfect knowledge about data semantics, which is seldom readily available. Thus, these tools generate random data that lacks the desired characteristics, such as syntaxes and semantics of the actual data on which the application would operate.

Some advanced synthetic data generation tools provide more insights into data and its semantics. However, such tools are generally costly and require manual preprocessing, such as providing metadata. Such preprocessing is a time consuming task and may introduce manual errors at the input stage of the testing. In addition to the above mentioned synthetic data generation tools, the synthetic data can also be generated using customized scripts based on varying requirements, which is a complicated task in itself. Moreover, the synthetic data generated using the customized scripts are typically non-reusable, and requires a skilled human resource for their generation.

The system and methods for test data generation, in accordance with an embodiment of the present subject matter, enables generating test data, which is a high utility data possessing desired characteristics of the actual operational data, i.e., the production data. In one implementation, any volume of the test data can be generated depending upon the application to be tested. In said implementation, the generated test data occupies less disk space, thereby facilitating efficient data storage.

For generating the test data, a low volume of seed data is received as input. The seed data referred herein can either be pre-existing, such as portions of production data itself or can also include user-defined data having the desired characteristics, such as syntax, semantics, and statistics of the production data. Upon receiving, the seed data is transformed for a predefined number of iterations to generate multiple data sets. Each of these multiple data sets contains transformed data, i.e., data which is different from the seed data but possess characteristics of the seed data. These data sets, thus generated, can be understood as replicas of the seed data containing varied data items. At the end of each iteration, one such data set is generated. These data sets when taken together or multiplied form the desired volume of the test data. Thus, by configuring the number of iterations, a desired volume of the test data can be generated. For example, when the desired volume of the test data is twice the volume of the seed data, the number of iterations can be specified as two iterations.

In one implementation, a selection criterion can be obtained from a user, when a selected portion of the seed data is to be chosen for transformation. The selection criterion thus indicates the selected portion that is chosen for the transformation. For example, portion of the seed data containing sensitive information can be chosen for transformation. In said implementation, only the selected portion of the seed data is transformed for a predefined number of iterations to generate multiple data sets. These multiple data sets may include a primary data set and one or more secondary data sets.

The primary data set is generated, for example, as a result of a first iteration of the transformation. Such a primary data set includes transformed data corresponding to the selected portion of the seed data, and non-transformed data corresponding to remaining portion of the seed data. While, the secondary data sets include only the transformed data corresponding to the selected portion of the seed data. The secondary data sets therefore represent incomplete data sets, carrying less volume of data, and thus occupy less storage area. These secondary data sets are generated, for example, as a result of the subsequent iterations of the transformation, say, one secondary data set is generated per subsequent iteration.

In said implementation, the data sets are loaded as test data in a test database. During loading, the primary data set, which is a complete data set, is loaded as it is into the test database. While, the secondary data sets that are incomplete data sets are first made complete data sets before loading. For this purpose, a temporary data set, which represents complete version of an incomplete secondary data set, is created for each of the secondary data sets. The temporary data sets are thus loaded into the test database, in place of loading the secondary data sets. For creating a temporary data set, non-transformed data in the primary data set is appended to the transformed data in the secondary data set. Thus, the resulting temporary data set contains both the transformed data and non-transformed data, thereby representing complete data set. In one embodiment, the generation, loading, and deletion of the temporary data sets takes place one by one. For example, a first temporary data set is generated, loaded and deleted, before the generation of the next temporary data set.

The loaded data sets in the test database, when taken together represents desired volume of the test data, which can be used for testing of an application. On the other hand, data which remains on a user disk or machine is only the primary data set and secondary data sets.

The systems and methods in accordance with an embodiment of the present subject matter thus enable loading the test data in the complete form or desired volume in the test database. However, the portion of the test data residing on the user disk is of comparatively less volume, thereby saving the disk space.

These and other advantages of the present subject matter would be described in greater detail in conjunction with the following figures. While aspects of described systems and methods for obtaining access rights to an encrypted document can be implemented in any number of different computing systems, environments, and/or configurations, the embodiments are described in the context of the following exemplary system(s).

Figure 1A:
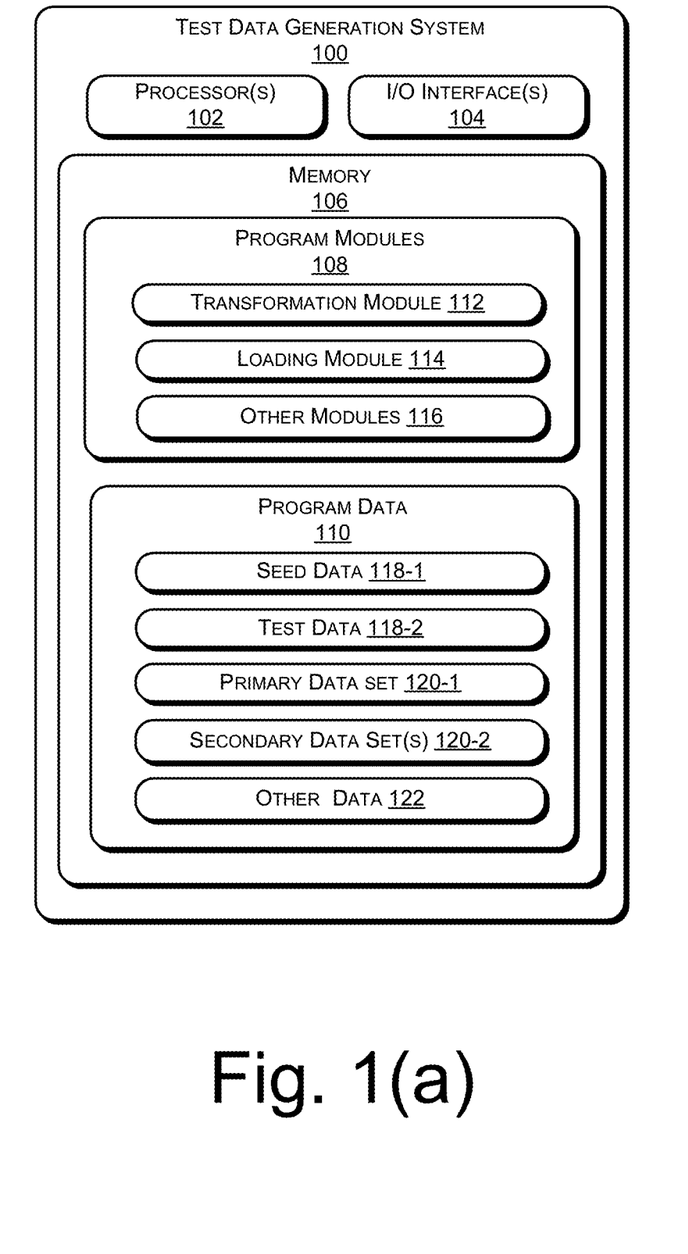
FIG. 1(a) illustrates a test data generation system, in accordance with an embodiment of the present subject matter.

FIG. 1(a) illustrates a test data generation system 100, according to an embodiment of the present subject matter. The test data generation system 100 (hereinafter referred to as system 100) may be implemented to provide a desired volume of test data for a data-driven assessment of an application. It should be noted that the testing of the application can be performed by testing the system that implements such an application. Examples of such applications include, but are not limited to, banking applications, accounting applications order-processing applications, etc.

The system 100 may be implemented as any computing device. For instance, the system 100 may be implemented as desktop computers, multiprocessor systems, laptops, network computers, cloud servers, minicomputers, mainframe computers, and the like. The system 100 includes one or more processor(s) 102, I/O interface(s) 104, and a memory 106 coupled to the processor 102.

The processor 102 can be a single processing unit or a number of units, all of which could include multiple computing units. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

The I/O interfaces 104 may include a variety of software and hardware interfaces, for example, a web interface, a graphical user interface, allowing the system 100 to interact with various user devices (not shown in the figure). Further, the I/O interfaces 104 may enable the system 100 to communicate with other computing systems, such as web servers and external databases. The I/O interfaces 104 can facilitate multiple communications within a wide variety of networks and protocol types, including wired networks, for example, local area network (LAN) cable, etc., and wireless networks, such as Wireless LAN (WLAN), cellular, or satellite. For the purpose, the I/O interfaces 104 may include one or more ports for connecting a number of computing systems to each other or to another server computer. In one implementation, the I/O interfaces 104 may support multiple database platforms and flat files which are data files that contain records with no structured relationships. Additional knowledge, such as the file format properties, is required to interpret the flat files.

The memory 106 may include any computer-readable medium known in the art, including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. Further, the memory 106 includes program module(s) 108 and program data 110.

The program modules 108, amongst other things, include routines, programs, objects, components, data structures, etc., which perform particular tasks or implement particular abstract data types. The program data 110 serves, amongst other things, as a repository for storing data that is received, processed, and generated by one or more of the program modules 108. In one implementation, the program modules 108 include a transformation module 112, a loading module 114 and other module(s) 116. The other modules 116 may also include programs that supplement applications implemented on the system 100, for example, programs in an operating system of the system 100.

The program data 110 includes, for example, seed data 118-1, primary data set 120-1, secondary data sets 120-2-2, test data, hereinafter referred to as test data 118-2, and other data 122. The other data 122 includes data generated as a result of the execution of one or more modules in the other modules 116.

In one implementation, the system 100 receives seed data 118-1 provided as input data for generating test data 118-2. The seed data 118-1 may include one or more characteristics. Further, a plurality of characteristics can also be associated with the seed data 118-1. In one implementation, examples of such characteristics include cell level characteristics, column level characteristics, and inter-column level characteristics, and so on. The cell level characteristics may be defined as micro level characteristics, for example, syntax, look and familiar feel of the seed data 118-1. For example, the syntax, in one example, may be defined as syntactic characteristics of the seed data 118-1. In such a case, the seed data 118-1 may be specified as certain combination of numeric or alphanumeric variables, or a variable having a fixed length. Other aspects for seed data 118-1 can also be specified, such as the look and feel of the seed data 118-1. For example, seed data 118-1 including names for Indian nationals would include commonly known names in India, such as Vijay, Srinivasan, Sachin, etc. On the other hand, the seed data 118-1 indicating information associated with foreign nationals would have varied types of names depending on the nationality requirements of the application in question.

The column level characteristics may include one or more macro level characteristics of the seed data 118-1. Examples of such characteristics include statistical characteristics and such. The column level characteristics can be used to ensure the correctness of the generated test data 118-2. The statistical characteristics may be defined as numerically expressed facts, for example, an average of a column of the seed data 118-1 or frequency distributions of data values in a column of the seed data 118-1. The checks may be defined as a test of certain conditions associated with a column of the seed data 118-1, for example, a check to verify whether a date field is greater than some specific date or a string field is never equal to NULL value.

In one implementation, the seed data 118-1 may be a production data which is the actual data or the production data on which the application to be tested, would eventually operate. The seed data 118-1 may be, for example, in form of a table. In another implementation, the seed data 118-1 may be provided by a user of the system 100. For example, in a case when the production data is not available, a user-defined or user-created data may be fed into the system 100 as the seed data 118-1. Further, the user-created data may be created with great care to maintain desired characteristics.

In one implementation, the transformation module 112 receives the seed data 118-1. Upon receiving, the transformation module 112 captures the characteristics associated with the seed data 118-1. Additionally, the transformation module 112 may also receive one or more characteristics of the seed data 118-1, say from a user through the I/O interfaces 104. Subsequent to capturing/receiving the characteristics of the seed data 118-1, the transformation module 112 transforms the seed data 118-1 to generate test data 118-2.

The transformation module 112 is configured to transform the seed data 118-1 for a predefined number of iterations to generate a desired volume of the test data 118-2. The number of iterations can be predefined or preset by the user. For example, the transformation module 112 transforms the seed data 118-1 five times to generate the test data 118-2 which is five times the volume of the seed data 118-1 provided. Notably, each transformation would result in unique values for test data 118-2. The transformation module 112 is further configured to transform the seed data 118-1, while preserving the characteristic of the seed data 118-1. The test data 118-2 generated by the transformation module 112 thus has a high utility in applications wherein a realistic data is required, for example, for performance testing, such as load testing of banking application programs.

In one implementation, the transformation module 112 can be configured to generate any volume of the test data 118-2 based on a relatively low volume of seed data 118-1. In said implementation, in case the predefined volume of test data 118-2 has not been generated, the transformation module 112 continues to transform the seed data 118-1 to provide the test data 118-2.

It will be appreciated that transforming the seed data 118-1 ensures that the data values of the generated test data 118-2 are different from the data values of the seed data 118-1, based on which the test data 118-2 is generated. In one implementation, certain portion of the seed data 118-1 can also be included in the test data 118-2.

In accordance with an embodiment of the present subject matter, the transformation module 112 is configured to transform only the selected portion, for example, one or more selected columns, of the seed data 118-1. In said embodiment, the transformation module 112 obtains a selection criterion indicating certain selected portion of the seed data 118-1 onto which transformation is to be applied. The transformation module 112 may obtain such selection criterion from a user, say, through the I/O interface(s) 104. In that respect, the transformation module 112 transforms data items in the selected portion for a predefined number of iterations to generate a multiple data sets. These data sets may include a primary data set 120-1 and one or more secondary data set(s) 120-2. The primary data set 120-1 and the secondary data set(s) 120-2 may be generated in the form of flat files.

As indicated previously, the transformation is performed in a predefined number of iterations. At the time of first iteration, the transformation module 112 transforms each data item in the selected portion of the seed data 118-1 to generate the primary data set 120-1. The data items in the remaining portion of the seed data 118-1 are retained and are included in their original form in the primary data set 120-1. The primary data set 120-1, thus, includes transformed data corresponding to the selected portion of the seed data 118-1, and non-transformed data corresponding to the remaining portion of the seed data 118-1.

During subsequent iterations of the transformation, the transformation module 112 transforms each data item in the selected portion of the seed data 118-1 to generate the secondary data set(s) 120-2. The secondary data set(s) 120-2, thus, include transformed data corresponding to the selected portion of the seed data 118-1. It is to be noted that the data corresponding to the non-transformed portion of the seed data 118-1 is not included in the secondary data set(s) 120-2 for the purpose of saving the disk space.

When the predefined number of iterations is performed, the loading module 114 within the system 100 loads the data sets as test data 118-2 in a test database (not shown in the figure) for the purpose of testing an application. In one implementation, the loading module 114 loads the primary data set 120-1 in the test database. As the primary data set 120-1 is a complete data set, the primary data set 120-1 is thus loaded as is it in the test database. While, the secondary data set(s) 120-2 are incomplete data sets, thus, the loading module 114 utilizes these secondary data set(s) 120-2 to generate temporary data sets for loading into the test database. For example, the loading module 114 generates a temporary data set in a sequential manner for each of the secondary data set(s) 120-2. The loading module 114 generates these temporary data sets by appending the non-transformed data in the primary data set 120-1 to the transformed data in the secondary data set(s) 120-2. The resulting temporary data set thus contains both the transformed data and non-transformed data, thereby representing complete data sets. The loading module 114 thereafter loads these temporary data sets in the test database. Once loaded, the loading module 114 deletes these temporary data sets.

Thus, the data sets, i.e., the primary data set 120-1 and temporary data sets, which are loaded in the test database, represent desired volume of the test data 118-2. While, the test data retained on a user disk includes the primary data set 120-1 and the secondary data set(s) 120-2, which occupy lesser disk space as compared to the test data 118-2, which is actually loaded in the test database.

In one implementation, the loading module 114 generate, load, and delete a temporary data set, before generating next temporary data set. For example, if number of iterations to be carried out is three, one primary data set 120-1 and two secondary data sets 120-2 are generated. In said example, while loading, the loading module 114 loads the primary data set 120-1 in the test database. Thereafter, the loading module 114 generates a first temporary data set by appending the non-transformed data in the primary data set 120-1 to the transformed data in the secondary data set 120-2. Upon generation, the loading module 114 loads the first temporary data set in the test database, and deletes the first temporary data set subsequent to the loading. The loading module 114 then generates the second temporary data set, loads the second temporary data set in the test database, and then deletes the second temporary data set. By doing so, the loading module 114 avoids sudden increase in memory space occupied by the generated data sets, at the time of loading.

Figure 1B:
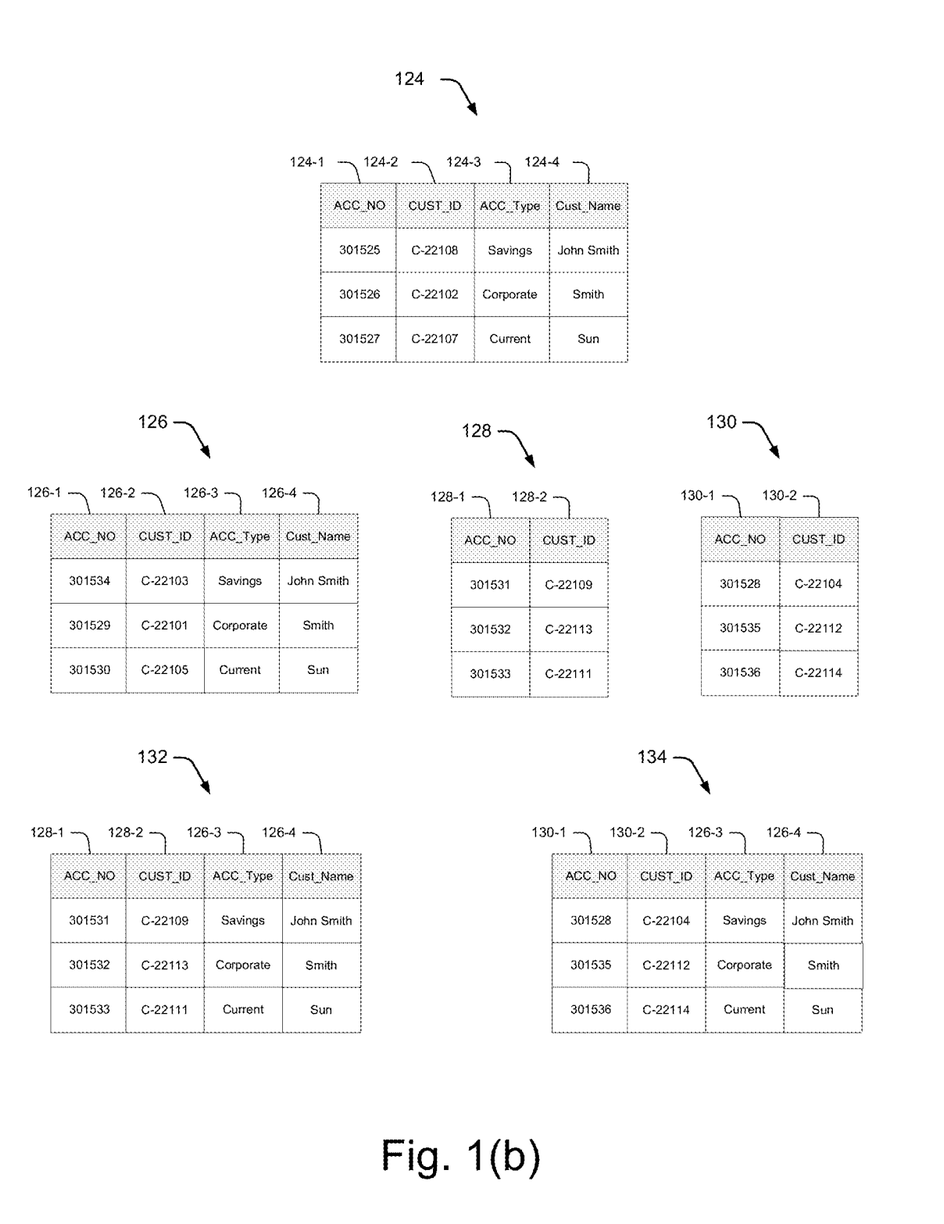
FIG. 1(b)-1(c) illustrate generation of test data taking exemplary seed data as input, according to an embodiment of the present subject matter.
Figure 1C:
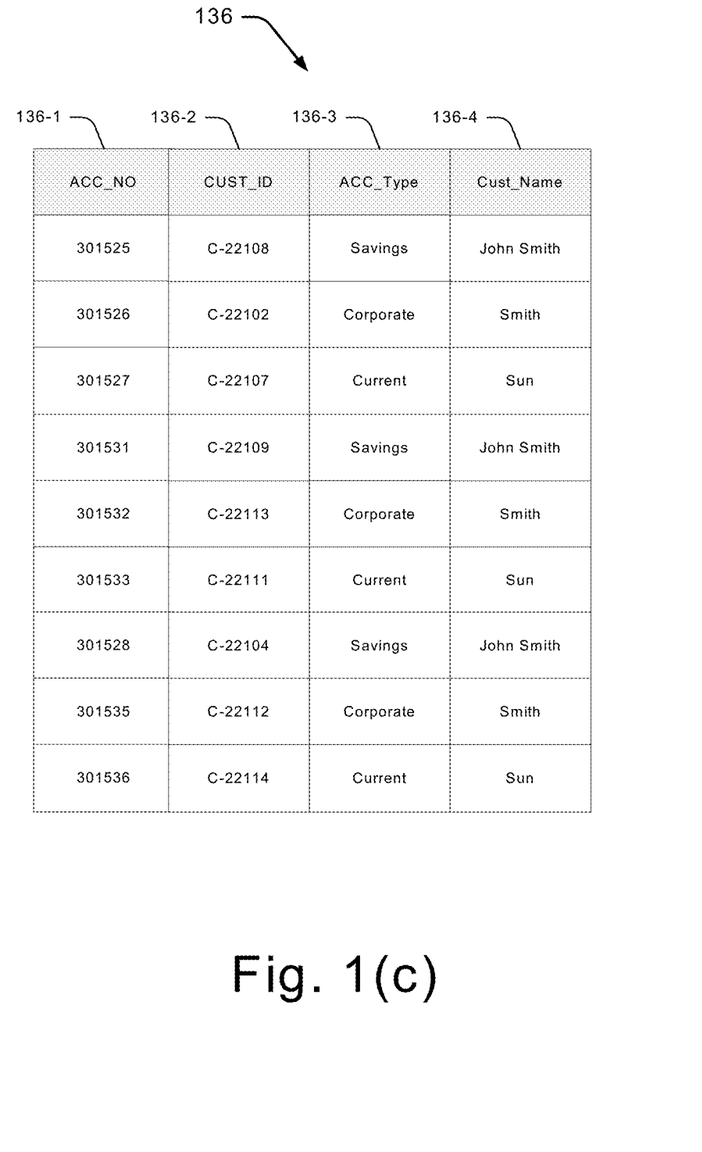

FIG. 1(*b*)-1(*c*) illustrates generation of test data 118-2 taking exemplary seed data 118-1 as input, according to an embodiment of the present subject matter.

As shown in the figure, seed data 118-1 is provided in a seed data table 124. This seed data table 124, which is an account table, is received by the transformation module 112. Total number of records shown in the seed data 118-1 is 3 records. Assuming the required volume of the test data 118-2 to be generated is thrice the volume of the seed data 118-1, the number of iterations can be defined as 3 in order to generate the desired volume of the test data 118-2.

As shown in the seed data table 124, columns 124-1 and 124-2 containing sensitive data like account numbers and customer IDs respectively are received as selected columns for transformation by the transformation module 112. Upon receiving, the transformation module 112 performs the first iteration of transformation. During first iteration, the transformation module 112 transforms each data item present in the columns 124-1 and 124-2, which are the selected columns for the transformation. While, the transformation module 112 retains data items present in remaining columns, i.e., columns 124-3 and 124-4 in their original form to generate a primary data set 126. Thus, the primary data set 126 as depicted in the figure, include transformed data in the columns 126-1 and 126-2, and non-transformed data in the columns 126-3 and 126-4.

Subsequent to the first iteration, the transformation module 112 performs the second iteration. During the second iteration, the transformation module 112 transforms each data item present in the selected columns 124-1 and 124-2, to generate a secondary data set 128. Thus, the secondary data set 128 as depicted in the figure, include transformed data in the columns 128-1 and 128-2.

Further, the transformation module 112 performs the third and the last iteration, where the transformation module 112 again transforms each data item present in the selected columns 124-1 and 124-2, to generate another secondary data set 130.

As described previously, the secondary data sets 128 and 130 represent incomplete data sets as these tables contain only the transformed data. The non-transformed data corresponding to the columns 124-3 and 124-4 of the seed data table 124 are not included in these secondary data sets 128 and 130.

As shown in the figure, the secondary data set 130 includes transformed data in the columns 130-1 and 130-2. It is to be understood that while performing the transformation, the transformation module 112 captures characteristics of the seed data 118-1, and generates the data sets including the primary data set 126 and secondary data sets 128 and 130 possessing the same characteristics as of the seed data 118-1. Here, the characteristics of the selected columns 124-1 and 124-2 are maintained in the corresponding columns 126-1 and 126-2, columns 128-1 and 128-2, and columns 130-1 and 130-2 respectively. The primary data set 126 and the secondary data sets 128 and 130, when taken together represent desired volume of the test data 118-2, i.e., 9 records, which is thrice the volume of the seed data table 124. These data sets, i.e., the primary data set 126 and the secondary data sets 128 and 130 are saved onto the user disk. As indicated in the figure, the secondary data sets 128 and 130 are the incomplete data sets as these data sets include only transformed data, these secondary data sets 128 thus occupy less disk space.

The test data 118-2, which is generated, can be loaded into a test database by the loading module 114. At the time of loading, the loading module 114 loads the primary data set 126 in the test database. Further, the loading module 114 generates a temporary data set 132, which is a complete version of the incomplete secondary data set 128, by appending the non-transformed data in the primary data set 126, which are represented by the columns 126-3 and 126-4 to the transformed data in the secondary data set 128. The loading module 114 then loads the temporary data set 132 into the test database. Once loaded, the loading module 114 deletes the temporary data set 132.

Thereafter, the loading module 114 generates another temporary data set 134, which is a complete version of the incomplete secondary data set 130, by appending the non-transformed data in the primary data set 126, which are represented by the columns 126-3 and 126-4 to the transformed data in the secondary data set 130. The loading module 114 then loads the temporary data set 134 into the test database, and deletes the temporary data set 134 subsequent to the loading.

Thus, the test 118-2 loaded onto the test database includes the primary data set 126, and the temporary data sets 132 and 134. In one implementation, the loaded test data 118-2 which is represented by a test data table 136 is illustrated in the FIG. 1(c). As shown in the test data table 136, the loaded test data 118-2 include 9 records, which is desired volume of the test data 118-2 to be generated. It is clear form the FIGS. 1(b) and 1(c) that although the test data 118-2 residing on the user disk occupy less disk space, the test data 118-2 is loaded in its complete form in the test database.

Figure 2:
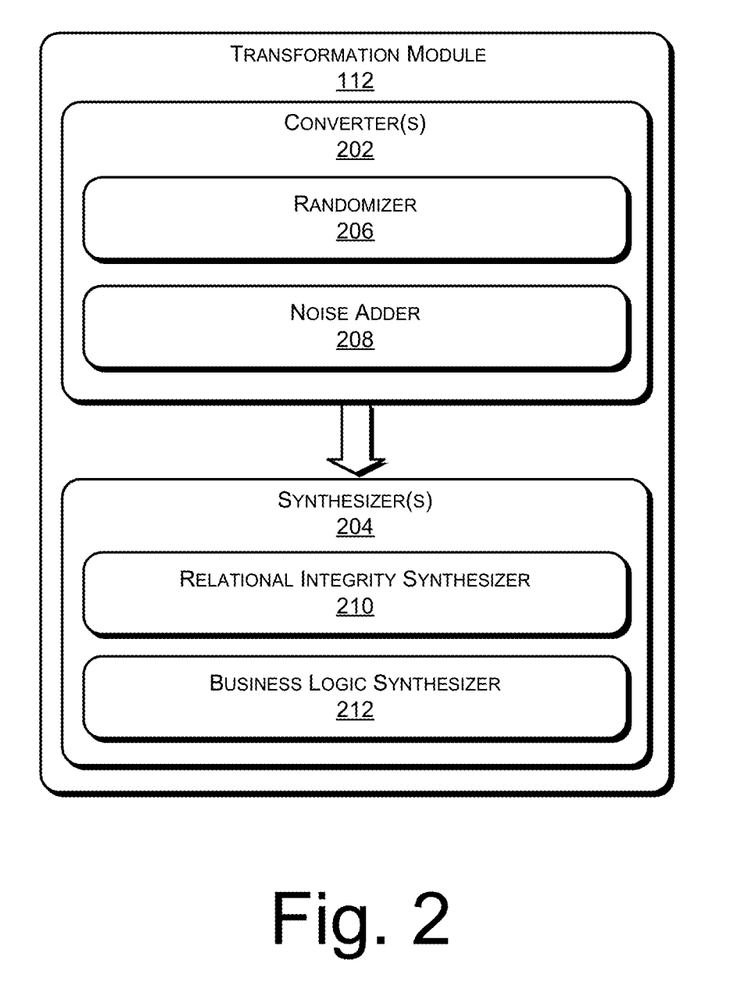
FIG. 2 illustrates a transformation module of the test data generation system of FIG. 1, in accordance with an embodiment of the present subject matter.

The manner in which transformation module 112 transforms the seed data 118-1 is further described in detail in conjunction with FIG. 2. FIG. 2 illustrates components of the transformation module 112 of the system 100, in accordance with an embodiment of the present subject matter.

In said embodiment, the transformation module 112 receives the seed data 118-1. On receiving, the transformation module 112 transforms the seed data 118-1, either in entirety and/or in portion, to generate multiple data sets, for example, the primary data set 120-1 and one or more secondary data set(s) 120-2. The transformation module 112 is configured to generate a desired volume of the test data 118-2 in multiple rounds or iterations, represented by a variable 'I'. The number of iterations (I) may be obtained from a user. As described previously, the number of iterations indicates desired volume of the test data 118-2 to be generated.

In an implementation, the transformation module 112 includes converter(s) 202 and synthesizer(s) 204. The converter(s) 202 preserves the cell and the column level characteristics of the seed data 118-1. In each round of transformation, the converter(s) 202 generates transformed data and provides it to the synthesizer(s) 204. The transformed data is based on the seed data 118-1 and includes information indicative of the characteristics that were associated with the seed data 118-1.

The synthesizer(s) 204, on receiving the transformed data from the converter(s) 202, processes the transformed data to provide relational characteristics between the columns of the transformed data. Examples of such characteristics include referential integrity, association between columns, etc. Once the relational characteristics are included in the transformed data, all the characteristics of the seed data 118-1 are preserved in the transformed data. In one implementation, the transformed data can be stored in the memory 106. After completion of an iteration of transformation, next iteration is performed on the seed data 118-1 and the transformed data obtained from each of the iterations of transformation is stored in the program data 110. For example, the transformed data after first iteration of transformation is stored as a primary data set 120-1. While, the transformed data from subsequent iterations is stored as secondary data set(s) 120-2. These data sets, i.e., the primary data set 120-1 and the secondary data set(s) 120-2 collectively represents desired volume of the test data 118-2, which can be loaded in a test database. In one implementation, the test data 118-2 so generated is a relational data.

The converter(s) 202 may further include a randomizer 206 and a noise adder 208 for preserving the cell level and, the column level characteristics. In one implementation, the randomizer 206 converts the seed data 118-1 by randomizing the seed data 118-1. The randomization implemented by the randomizer 206 can be based on predefined criteria. The randomizer 206 may be any randomizer known in the art, for example, a list-based randomizer, a range-based randomizer, a regular-expression-based randomizer, etc. It would be appreciated that the randomization of the seed data 118-1 ensures that the data so obtained is statistically varied in a manner similar to statistical variations of the actual data.

In one implementation, the randomizer 206 implements list-based randomization based on the following equation:

$$_g X_i^r = L[m*(I-1)+i]$$

In the above equation m is the number of records in the input seed data 118-1, I is the number of iterations, i is the data item, and L is the list of values that can be used for generating test data 118-2 and having number of elements greater than equal to the total number of records required in the test data 118-2.

The statistical properties of the transformed data can also be preserved through the noise adder 208. In one implementation, the noise adder 208 adds a noise parameter to the original seed data 118-1 to obtain the transformed data. The noise parameter can be generated by the noise adder 208. In another implementation, the noise adder 208 generates the noise parameter based on the seed data 118-1. The noise adder 208 may be implemented using noise addition techniques known in the art, examples of which include, but are not limited to, a Gaussian-based noise addition, a range-based noise addition, a percentage-based noise addition, a shift based noise addition etc.

In one implementation, the converter(s) 202 may also include customized converters (not shown in the figures) in addition to the predefined converters depending upon the requirement of the test data generation process. The user may add the customized converters in the transformation module 112 through the I/O interface(s) 104. The customized converters may be implemented for any data type. In one implementation, customized converters may be configured to process only the data present in the columns of the seed data 118-1 based upon the data type of the column.

As previously mentioned, the converter(s) 202 converts the seed data 118-1 to provide the transformed data. The transformed data is then passed to the synthesizer(s) 204. The synthesizer(s) 204 is configured to maintain inter-column data characteristics, such as referential integrity column-wise association, etc., within the transformed data. In one implementation, the synthesizer(s) 204 processes the transformed data received from the converter(s) 202 to generate test data 118-2. The transformed data, as described, has the cell level and the column level characteristics based on the seed data 118-1. In the end, the generated data consisting of the primary data set 120-1 and the secondary data set(s) 120-2, in one example, preserves all the characteristics of the seed data 118-1.

In one implementation, the synthesizer(s) 204 includes relational integrity synthesizer 210 and a business logic synthesizer 212. The relational integrity synthesizer 210 is configured to implement relational aspects in the test data 118-2. The relational aspects are based on the relational aspects of the actual data, such as the seed data 118-1.

For example, the relational integrity synthesizer 210 generates those values that act as primary keys for the data sets. As is known in the art, a primary key uniquely identifies individual records and thus is always unique value. The primary key cannot be a NULL value. In one implementation, the relational integrity synthesizer 210 can be configured to generate unique keys for the data sets. In one implementation, the relational integrity synthesizer 210 can be configured to generate foreign keys for the data sets. Foreign keys, along with the primary keys and unique keys can be used for establishing a relational association between the data entries of the data sets generated by the synthesizer(s) 204.

On the other hand, the business logic synthesizer 212 implements in the data sets, semantics that are based on business logic. For example, in case the generated data sets relates to banking related information, the business logic synthesizer 212 can implement a business logic for checking whether the account balance is less than zero or not.

In another embodiment, the synthesizer(s) 204 may include additional synthesizers to preserve other inter-column characteristics of the seed data 118-1, for example, relationships across columns and derivational characteristics across columns. In said embodiment, a relationships synthesizer and a derivational synthesizer may be provided in the synthesizer(s) 204. The relationships synthesizer helps meet relationships across columns. For example, the relationships synthesizer would come into play for two records A and B in an HR database if A.employee_id>B.employee_id to enforce A.joining_date>B.joining_date. The derivational synthesizer helps meet a clause of deriving data values for a column from other columns of a single table or multiple tables. For example, an international calling number column in a phone number database can be derived by concatenating data values from the country code column and phone number column.

In one implementation, all of the above mentioned synthesizers are included in the transformation module 112 such that the outcome of the converter(s) 202 is effectively synthesized and the data sets represent high utility data.

Figure 3A:
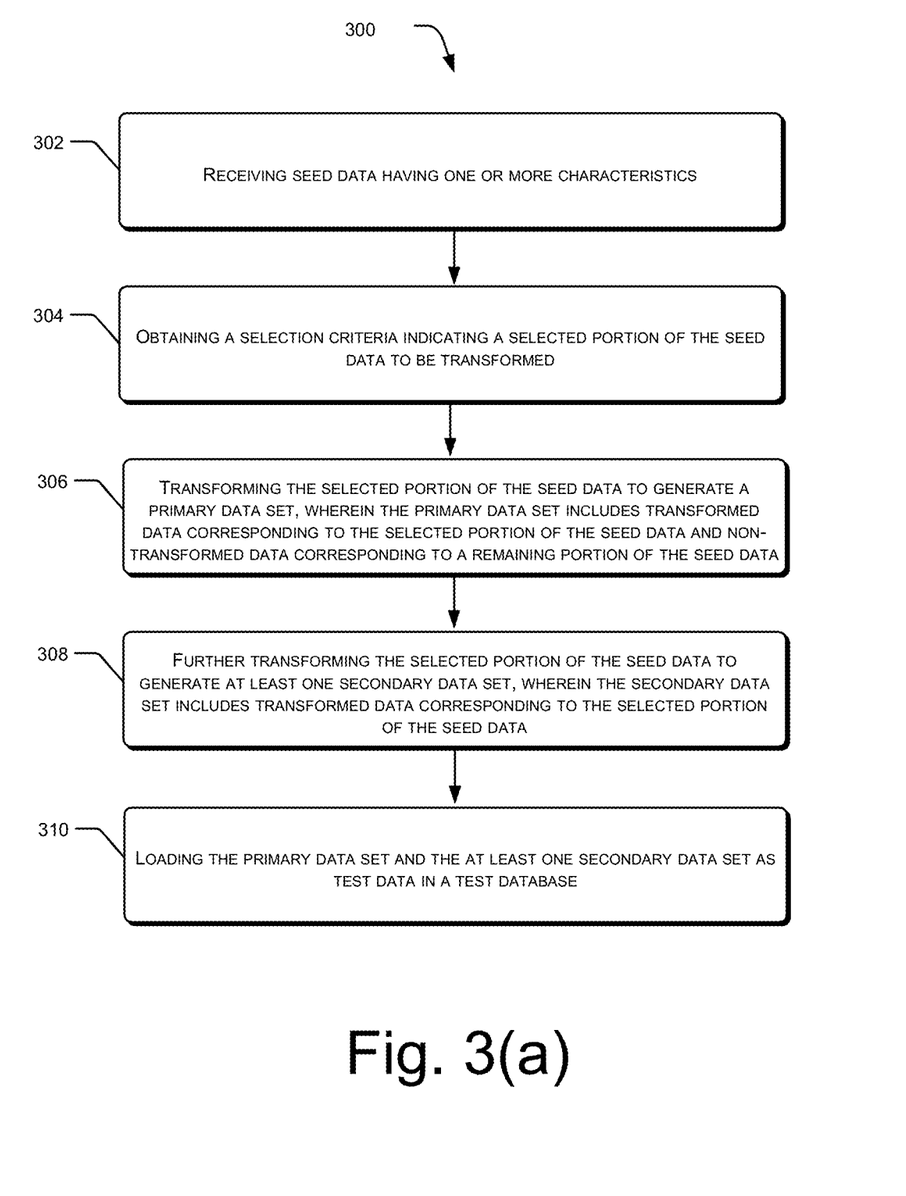
FIG. 3(a) illustrates a method of test data generation, in accordance with an embodiment of the present subject matter.
Figure 3B:
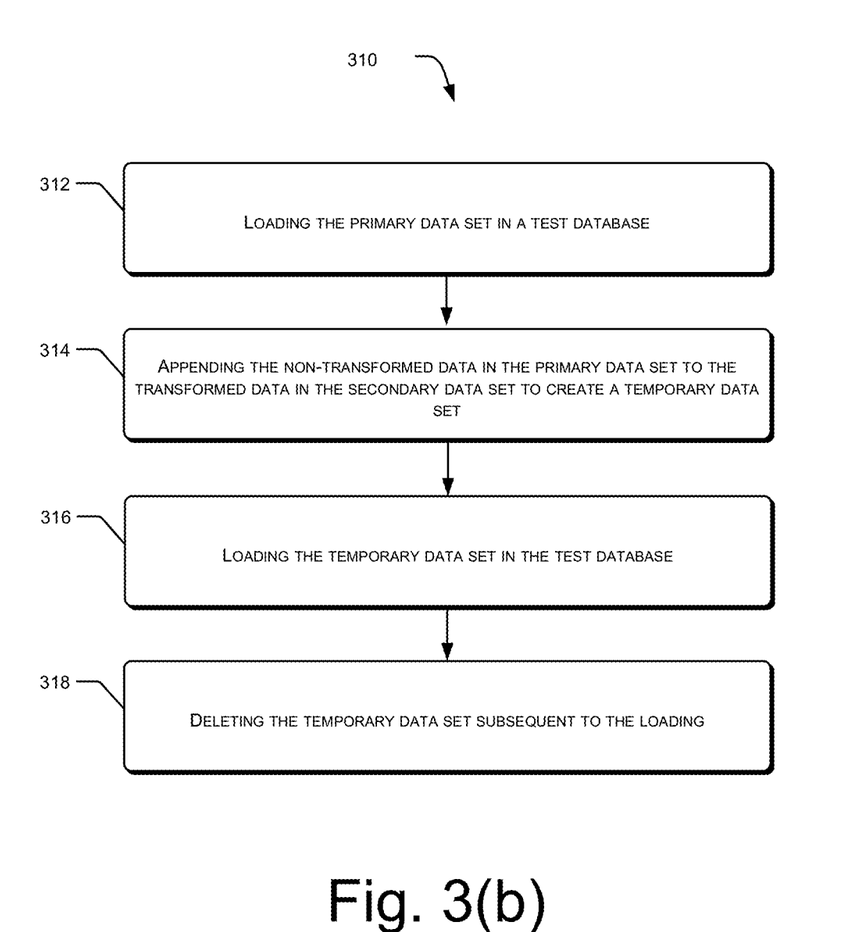
FIG. 3(b) illustrates a method of loading test data in a test database, in accordance with an embodiment of the present subject matter.

FIG. 3(*a*) illustrates a method 300 for test data generation, according to an embodiment of the present subject matter, and FIG. 3(*b*) illustrates a method 310 for loading the test data in a test database, according to an embodiment of the present subject matter. The methods 300 and 310 may be described in the general context of computer executable instructions.

Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communication network. In a distributed computing environment, computer executable instructions may be located in both local and remote computer storage media, including memory storage devices.

The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. Furthermore, the methods can be implemented in any suitable hardware, software, firmware, or combination thereof.

Referring to the FIG. 3(*a*), which illustrates a method 300 for test data generation, according to an embodiment of the present subject matter.

At block 302, seed data having one or more characteristics is received as input. The characteristics associated with the seed data are similar to the characteristics of the test data which is to be generated. Examples of such characteristics include cell-level characteristics, column characteristics, inter-column characteristics, syntax, semantics, statistics etc. In one implementation, the transformation module 112 receives the seed data 118-1 having one or more characteristics as input for generating desired volume of the test data 118-2. The seed data 118-1 can be a portion of the production data, or user-defined data having the desired characteristics, such as syntax, semantics, and statistics of the production data. In one implementation, the seed data 118-1 is in form of a table, for example, the seed data table 124.

At block 304, a selection criterion indicating a selected portion of the seed data 118-1 for transformation is obtained. In one implementation, a portion of the seed data 118-1 can be selected for transformation. In said implementation, the transformation module 112, for example, receives the selection criterion. The selection criterion may include selected columns in the seed data table that are chosen for transformation.

At block 306, the selected portion of the seed data is transformed to generate a primary data set, where the primary data set includes transformed data corresponding to the selected portion of the seed data and non-transformed data corresponding to a remaining portion of the seed data. The remaining portion refers to portion of the seed data that is not selected for the transformation. It is to be understood that the data transformation is performed in a predefined number of iterations. The primary data set referred herein is obtained as a result of the first iteration. The primary data set can be in form of a flat file.

In one implementation, the transformation module 112 transforms the selected portion of the seed data 118-1 to generate the primary data set 120-1. The transformed data so generated possess the characteristics of the seed data 118-1. Further, the transformed data in the primary data set includes data items different from the data items in the seed data 118-1.

At block 308, the selected portion of the seed data is further transformed to generate at least one secondary data set, where the secondary data set includes transformed data corresponding to the selected portion of the seed data. The secondary data set(s) thus represents incomplete data set(s), as non-transformed data corresponding to the remaining portion of the seed data is not copied in the secondary data set(s). In one implementation, the transformation module 112 receives the selected portion of the seed data 118-1, and transforms this selected portion of the seed data 118-1 to generate one or more secondary data set(s) 120-2. These secondary data set(s) 120-2 are the result of the subsequent iterations after the first iteration, i.e., one secondary data set 120-2 is created at the end of every subsequent iteration.

As described previously, the number of iterations can be predefined or preset, for example, by a user. In an example, when the predefined number of iterations is three, one primary data set, and two secondary data sets are created. The transformed data so generated possess the characteristics of the seed data 118-1. Further, the transformed data in the secondary data set includes data items different from the data items in the seed data 118-1.

At block 310, the primary data set and the secondary data set(s) are loaded as test data in a test database. In one implementation, the loading module 114 loads the primary data set 120-1 and the secondary data set(s) 120-2 as test data 118-2 in the test database.

The manner in which loading takes place is described in detail in the method 310 illustrated in the FIG. 3(*b*). In one implementation, the method 300 may be implemented using parallelization, thereby providing the desired amount of the generated data more quickly. For the purpose, multiple transformations are simultaneously performed on the seed data 118-1.

In one implementation, in order to generate a voluminous data, the method 300 may be implemented by performing an experimental transformation first to generate a small amount of data, validating the data generated from the experimental transformation, and then performing an actual transformation to generate the required volume of data.

Referring to the FIG. 3(b), which illustrates a method 310 for loading the test data 118-2 in a test database, according to an embodiment of the present subject matter.

At block 312, the primary data set is loaded in the test database. As the primary data set represents complete data set, the primary data set is as it is loaded into the test database. In one implementation, the loading module 114 loads the primary data set 120-1 in the test database.

At block 314, non-transformed data in the primary data set is appended to the transformed data in the secondary data set to create a temporary data set. The temporary data set, thus, represents complete data set, and can be loaded in the test database in place of loading the secondary data set. In one implementation, the loading module 114 appends the non-transformed data in the primary data set 120-1 to the transformed data in each of the secondary data set 120-2 to create temporary data set.

At block 316, the temporary data set is loaded into the test database. In one implementation, the loading module 114 loads the temporary data set in the test database.

At block 318, the temporary data set is deleted subsequent to the loading. In one implementation, the loading module 114 deletes the temporary data set after the loading.

The method blocks 314, 316, and 318 described in the method 310 are explained with references to a single secondary data set for the purpose of explanation. It is to be understood that the method blocks 314, 316, and 318 is performed for each of the secondary data sets. In this respect, for each of the secondary data sets, one temporary data set is created, loaded and deleted. For example, for a first secondary data set, one temporary data set is created, loaded and then deleted. Thereafter, for a next secondary data set, another temporary data set is created, loaded and deleted, and so on.

Thus, during the loading process, one temporary data set is generated at a time, next temporary data set is created when the previous temporary data set is loaded in the test database and deleted after the loading. By doing so, a sudden increase in memory space at any particular point of time is avoided.

Although implementations for methods and systems for test data generation have been described in language specific to structural features and/or methods, it is to be understood that the appended claims are not necessarily limited to the specific features or methods described. Rather, the specific features and methods are disclosed as exemplary implementations for test data generation.

We claim:

1. A method for generating test data comprising:
receiving seed data having one or more characteristics;
obtaining a selection criterion indicating a selected portion of the seed data to be transformed;
transforming the seed data for at least a plurality of iterations to generate test data, wherein the test data comprise a plurality of data sets including a primary data set generated in a first iteration and a secondary data set generated in each subsequent iteration such that the primary data set includes transformed data corresponding to the selected portion of the seed data and non-transformed data corresponding to a remaining portion of the seed data and each secondary data set includes transformed data corresponding to the selected portion of the seed data; and
loading the test data in a test database, wherein the loading comprises:
transferring the primary data set into the test database;
appending the non-transformed data in the primary data set to the transformed data in the secondary data set to generate a temporary data set;
further transferring the temporary data set into the test database; and
deleting the temporary data set.

2. The method as claimed in claim 1, wherein the plurality of iterations is based on volume of the test data to be generated.

3. The method as claimed in claim 1, wherein the characteristics includes cell level characteristics, column level characteristics, and inter-column level characteristics.

4. The method as claimed in claim 1, wherein the seed data is based at least in part on production data.

5. The method as claimed in claim 1, wherein the seed data seed data is based at least in part on user-defined data.

6. A test data generation system comprising:
a processor;
a memory coupled to the processor, wherein the memory comprises
a transformation module configured to transform seed data for at least a plurality of iterations to generate test data, wherein the test data comprise a plurality of data sets including a primary data set generated in a first iteration and a secondary data set generated in each subsequent iteration such that the primary data set includes transformed data corresponding to the selected portion of the seed data and non-transformed data corresponding to a remaining portion of the seed data and each secondary data set includes transformed data corresponding to the selected portion of the seed data; and
a loading module configured to:
transfer the primary data set into a test database;
append the non-transformed data in the primary data set to the transformed data in the secondary data set to generate a temporary data set;
further transfer the temporary data set into the test database; and
delete the temporary data set.

7. The test data generation system as claimed in claim 6, wherein the transformation module comprises one or more converters configured to generate the plurality of data sets including at least one of cell level characteristics and column level characteristics of the seed data.

8. The test data generation system as claimed in claim 6, wherein the transformation module comprises one or more synthesizers configured to generate the plurality of data sets including at least inter-column characteristics.

9. A computer-readable medium having embodied thereon a computer program for executing a method comprising:
receiving seed data having one or more characteristics;
obtaining a selection criterion indicating a selected portion of the seed data to be transformed; and
transforming the seed data for at least a plurality of iterations to generate test data, wherein the test data comprise a plurality of data sets including a primary data set generated in a first iteration and a secondary data set generated in each subsequent iteration such that the primary data set includes transformed data corresponding to the selected portion of the seed data and non-transformed data corresponding to a remaining portion of the seed data and each secondary data set includes transformed data corresponding to the selected portion of the seed data; and
loading the test data in a test database, wherein the loading comprises:
transferring the primary data set into the test database;

appending the non-transformed data in the primary data set to the transformed data in the secondary data set to generate a temporary data set;
further transferring the temporary data set into the test database; and
deleting the temporary data set.

10. The computer-readable medium as claimed in claim 9, wherein the plurality of iterations is based on volume of the test data to be generated.

11. The computer-readable medium as claimed in claim 9, wherein the characteristics includes cell level characteristics, column level characteristics, and inter-column level characteristics.

12. The computer-readable medium as claimed in claim 9, wherein the seed data is based at least in part on production data.

13. The computer-readable medium as claimed in claim 9, wherein the seed data is based at least in part on user-defined data.

* * * * *